May 12, 1964     F. L. LE BUS, SR     3,132,526
GEAR BOX ATTACHMENT FOR LATHES
Filed Aug. 10, 1961     2 Sheets-Sheet 1
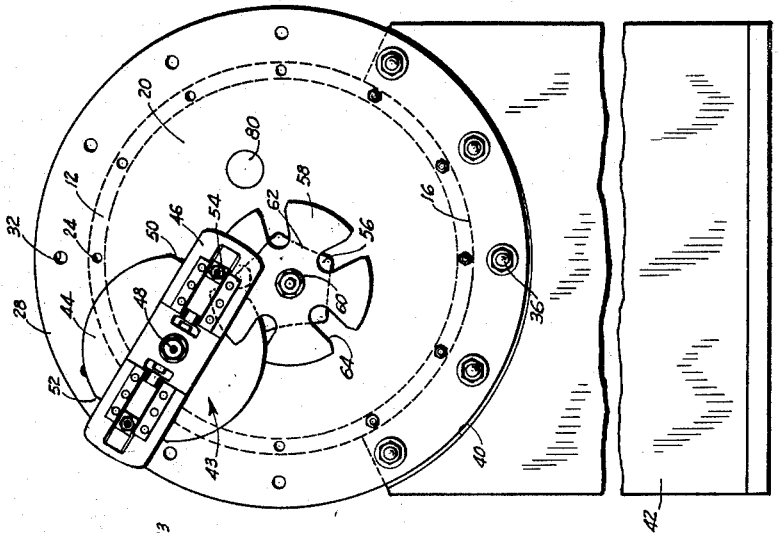
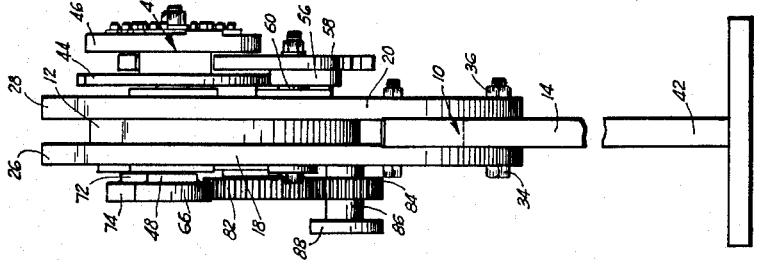
INVENTOR.
F.L. Le Bus Sr.
BY
C. M. McKnight
ATTORNEY INVENTOR.
F. L. Le Bus Sr.

United States Patent Office 3,132,526
Patented May 12, 1964

3,132,526
GEAR BOX ATTACHMENT FOR LATHES
Franklin L. Le Bus, Sr., Longview, Tex., assignor to Le Bus Royalty Company, Longview, Tex., a partnership
Filed Aug. 10, 1961, Ser. No. 130,564
8 Claims. (Cl. 74—63)

This invention relates to an attachment for a lathe, and more particularly, but not by way of limitation, to an universal gearing attachment for adapting substantially any type of lathe for cutting alternate helical and straight grooves on the periphery of a cylindrical work piece.

In the spooling of cable onto a drum, it is often desirable to provide the outer periphery of the cylindrical drum with one continuous circumferential groove having alternate helical portions and straight or parallel portions. For example, in the manufacturing of a cable winding drum such as utilized in my prior Patent No. 2,734,695, issued February 14, 1956, and entitled "Balanced Cable Spooling," variable shaped grooves are formed on the outer periphery of the drum portion for receiving the first layer of the cable. This groove is preferably one continuous circumferential groove extending throughout the length of the cylindrical drum. Helical or tapered portions are provided in the groove interposed between parallel or straight portions for facilitating the winding of the cable onto the drum. It is preferable to provide two helical portions and two straight portions for each complete revolution of the drum.

There are devices available today for the cutting of a continuous groove having alternate straight and helical portions. With the normal screw cutting lathe, however, it is usually necessary to cut one complete revolution of straight groove and one complete revolution of the helical groove. These tools are usually not capable of providing combined helical and straight threads or grooves in one revolution of the work piece, and, thus, cannot be utilized in the manufacture of cable winding drums as hereinbefore set forth, or similar members wherein it is desired to provide a combined helical and straight thread within one revolution of the cylindrical member. Furthermore, there are many types and sizes of lathes in use today, and any attachment for adapting a lathe to a particular cutting pattern must normally be tailor made for the individual lathe with which the attachment is to be utilized. This is an expensive and time consuming means for adapting a lathe to perform these special cutting operations.

The present invention contemplates a novel universal attachment for connection with the gear train of substantially any type lathe, or to supplement the usual gear train to adapt the lathe for the cutting of alternate helical and straight grooves. An adjustable housing is provided with a Geneva type gearing arrangement adapted for connection with the output and input shafts of the lathe in order to control the rotation of the lead screw and, thus, control the movement of the cutting tool whereby the alternate helical and straight grooves may be machined on the outer periphery of the work piece. A cam member carried by the housing is geared for rotation during operation of the lathe in order to cause the lathe cutting tool to cut a straight groove during a portion of one revolution of the cylinder or work piece secured in the lathe. In one position, however, the cam member permits the cutting tool to move in a manner to cut a tapered or helical groove during the same revolution of the cylinder. The cutting of the groove on the work piece by the tool is a continuous operation. It is not necessary to stop the machine or move the cutting tool in any manner to provide a continuous circumferential groove along the outer periphery of the cylinder or work piece, since the intermittent rotation of the lead screw is automatically controlled by the Geneva gear arrangement. Thus, the groove of a cable winding drum, or the like, may be expeditiously accomplished in an efficient and economical manner. In addition, the housing may be adjusted whereby the gearing members carried thereby will orientate to conform to the arrangement of the lathe for facilitating the connection thereof with the output and input shafts of substantially any type and size of lathe, thus providing one gearing attachment for a universal utilization.

It is an important object of this invention to provide a gearing attachment for a lathe which is particularly designed and constructed for utilization with substantially any type and size lathe.

It is another object of this invention to provide a universal attachment for a lathe wherein a circumferential groove having alternate straight portions and helical portions may be machined on the periphery of a cylindrical work piece.

Still another object of this invention is to provide a universal lathe attachment adapted for connection with or to supplement the gear train of the lathe in order to permit the machining of alternate straight and helical portions in one revolution of a circumferential groove.

It is a further object of this invention to provide a universal lathe attachment which permits the machining of a continuous circumferential groove having variable shaped portions in a manner wherein the lathe cutting tool may operate continuously throughout the length of the work piece without the necessity of adjustment of the cutting tool.

It is another object of this invention to provide a universal lathe attachment wherein the gearing members thereof may be readily orientated in accordance with the arrangement of substantially any lathe for facilitating the connection thereof with the output and input shafts of the lathe.

A still further object of this invention is to provide a universal gearing attachment for a lathe which is simple and efficient in operation and economical and durable in construction.

Other objects and advantages of the invention will be evident from the following detailed description, read in conjunction with the accompanying drawings, which illustrate my invention.

In the drawings:

FIGURE 1 is a front elevational view of a lathe attachment embodying the invention.

FIGURE 2 is an end elevational view of a lathe attachment embodying the invention.

FIGURE 3 is a rear elevational view of a lathe attachment embodying the invention.

Figure 4:
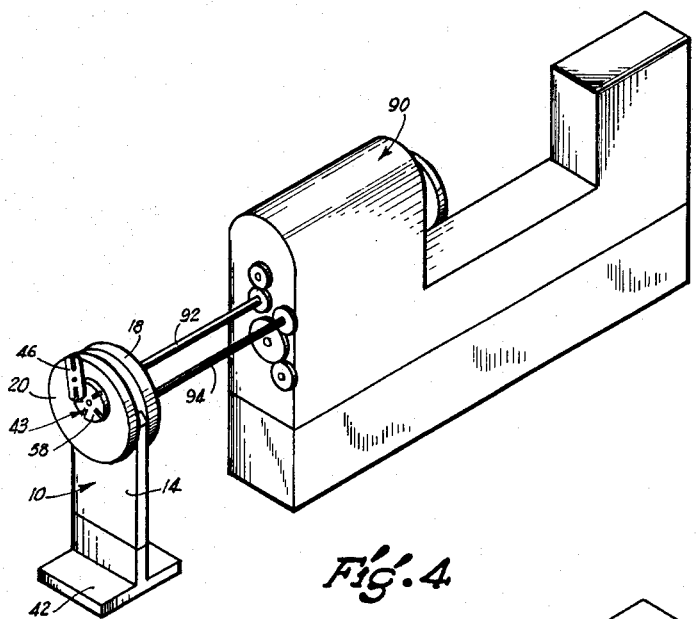
FIGURE 4 is a perspective view depicting the novel lathe attachment secured to one type of lathe.

Referring to the drawings in detail, reference character 10 generally indicates a lathe attachment comprising a substantially cylindrical housing or gear box 12 carried by an upright support member 14. The upper edge of the support member 14 is provided with an arcuate recess 16 of a configuration complementary to the outer periphery of the housing 12 for receiving the housing therein. A front plate 18 and a rear plate 20 are removably secured to the opposed ends of the housing 12 in any suitable manner, such as the spaced bolts 22 and 24, respectively. The plates 18 and 20 extend radially outward from the outer periphery of the housing 12, as particularly depicted in FIG. 2, thus providing outwardly extending circumferential flanges 26 and 28 completely encircling the opposed ends of the housing 12. The flange 26 is provided with a plurality of circumferentially spaced apertures 30 extending therearound, preferably spaced at thirty degree or fifteen degree angular intervals as radially measured from the center of the plate 18, but not limited thereto. The flange 28 is provided with a plurality of similarly spaced apertures 32 in alignment with the apertures 30 for a purpose as will be hereinafter set forth.

A plurality of apertures (not shown) are provided in the support member 14 spaced slightly from the arcuate recess 16 and preferably disposed at angular intervals complementary to the angular intervals between the spaced apertures 30 and 32. The housing 12 may be disposed in the recess 16 in such a manner that a plurality of the apertures 30 and 32 will be aligned with the apertures provided in the support 14 whereby bolts or studs 34 may be disposed therethrough and secured therein by nuts 36 for retaining the flanges 26 and 28 and the housing 12 in position on the support member 14. The front portion of the support 14 may be provided with a circular cut away portion 38 conterminous with the recess 16, if desired, to provide clearance for the flange 26, and the rear face of the support 14 may be provided with a similar circular cut away portion 40 to provide clearance for the flange 28. It will be apparent that the flanges 26 and 28 may abut against the opposed faces of the support 14 without the circular cut away portions 38 and 40, if desired, but it has been found that the circular cut away portions facilitate the adjustment of the housing 12 on the support 14.

The housing 12 may be rotated with respect to the support member 14 to provide substantially any desired orientation for the housing by removing the nuts 36 for releasing the bolts 34. The bolts 34 may be removed from the aligned apertures 30 and 32, and the housing 12 and plates 18 and 20 may be revolved in the recess 16 to provide the desired positioning for the housing, as will be hereinafter set forth. The additional, or others of the, apertures 30 and 32 which will then be in alignment with the apertures in the support 14 will be in position for receiving the bolts 34 and locking nuts 36 whereby the housing 12 may be securely retained on the support member. In this manner, the housing 12 may be readily orientated for substantially any desired installation. As hereinbefore set forth, the apertures 30 and 32 may be disposed at any desired angular intervals to provide substantially any degree of adjustment for the housing 12. As a practical matter, however, intervals of thirty or fifteen degrees have been found to be satisfactory.

It is preferable to provide means for adjusting the height of the support member 14. As shown in FIGS. 1 through 3, a T-shaped base member 42 may be provided for the support 14, and may be secured thereto in any suitable manner (not shown), such as by welding, or the like, or by bolting the support 14 thereto. In this manner, substantially any desired height may be provided for the support member 14 in order that the housing 12 may be carried or disposed at substantially any desired vertical distance from the ground or floor in accordance with the installation of the lathe attachment 10, as will be hereinafter set forth.

Referring now to FIG. 2, the Geneva gearing arrangement, generally indicated at 43, carried by the housing 12 may be of any suitable type, and as depicted herein comprises a brake cam 44 and a driving arm 46 suitably keyed or otherwise secured to a rotatable shaft 48 for rotation simultaneously therewith. The cam plate 44 is preferably substantially circular in configuration, and is provided with a pair of oppositely disposed flat or straight portions 50 and 52 on the outer periphery thereof for a purpose as will be hereinafter set forth. The driving arm 46 is slightly spaced from the cam plate 44, as clearly shown in FIG. 2, and preferably extends diametrically therefrom to a position slightly beyond the flat surfaces 50 and 52 of the cam member 44. The longitudinal center line (not shown) of the driver arm 46 is preferably substantially perpendicular to the flat edge portions 50 and 52 of the cam member 44. A pair of oppositely disposed driving pins 54 are bolted, or the like, to the driving arm 46 and extend transversely therefrom in a direction toward the cam plate 44.

A locking cam 56 and a feed cam 58 are keyed or otherwise secured to a second rotatable shaft 60 spaced from the first shaft 48 whereby the outer periphery of the locking cam 56 is in contact with the outer periphery of the brake cam 44. The feed cam 58 is interposed between the brake cam 44 and driver arm 46, as shown in FIG. 2. The locking cam 56 is provided with a plurality of concave portions 62 circumferentially spaced around the entire outer periphery thereof. The concave portions 62 are of substantially the same configuration as the major periphery of the arcuate brake cam 44 and are adapted to cooperate therewith in a manner as will be hereinafter set forth. The feed cam 58 is provided with a plurality of circumferentially spaced radially extending, inwardly directed slotted portions 64 for receiving the driving pin members 54 during certain positions thereof to transmit rotation to the feed cam plate member 58. The rotation of the feed cam plate member 58 in turn transmits rotation to the shaft 60 and locking cam 56.

Referring now to FIG. 1, a suitable flange fitting member 66 is carried by the shaft 48 and is adapted for connection with a lathe, as will be hereinafter set forth. The shaft 48 is the input shaft for the apparatus 10 and extends through the housing 12 and through the plate 20 for receiving the brake cam 44 and driver arm 46, as hereinbefore set forth. A gear 68 is carried by the shaft 48 and disposed within the housing 12 for meshing with a gear 70 carried by a shaft 72 which carries a flange fitting member 74 off-set from the fitting 66. When it is desired to provide a one to one ratio for the Geneva gearing arrangement 43, connection is made directly with the shaft 48 through the fitting 66. However, when a drive ratio of two to one is desired for the Geneva gearing arrangement 43, connection with the shaft 48 is made through the auxiliary fitting 74 and meshing gears 70 and 68.

The shaft 60 extends through the plate 20 and into the housing 12 and is journalled at the opposite end in the plate 18 in any suitable manner. A gear 76 is carried by the shaft 60 and is disposed within the housing 12 for meshing with a gear 78 carried by a rotatable shaft 80. The shaft 80 is journalled between the plates 18 and 20 and extends through the front plate 18 for receiving a second gear 82 thereon which meshes with a gear 84 (FIG. 2) carried by a rotatable shaft 86 suitably journalled in the plate 18. The shaft 86 is the output shaft for the apparatus 10 and extends outwardly from the plate 18 and through a flanged fitting member 88 adapted for connection with the lathe, as will be hereinafter set forth.

The shaft 48 is adapted to be connected with the output shaft (not shown) of a lathe 90 by a suitable flexible shaft 92, as is clearly shown in FIG. 4. Similarly, the shaft 86 is adapted to be connected with the input shaft (not shown) of the lathe 90 by a suitable flexible shaft 94. The flexible shafts 92 and 94 may be of any well known type and are normally rigid shafts having flexible connection members (not shown) at the opposed ends thereof in order that rotation may be transmitted between two shafts which are not in exact axial alignment with each other. As a practical matter, it is desirable that the angle of the flexible shafts 92 and 94 not exceed approximately fifteen degrees. Thus, the spacing or distance between the axes of the shaft 48 and 86 is preferably selected in order that the angle of the flexible shafts 92 and 94 may be maintained within the desired limits in order that the apparatus 10 may be universally adapted to substantially all types and sizes of lathes. The spacing between the shafts 48 and 86 is preferably between sixteen inches and eighteen inches, but not limited thereto.

Operation

When it is desired to adapt the lathe 90, as shown in FIG. 4, for machining a continuous circumferential groove of combined helical and straight portions in one revolution on the outer periphery of a cylindrical work piece (not shown), the gearing attachment or gear box apparatus 10 may be secured to the input and output shafts of the lathe for controlling the rotation of the lathe lead screw (not shown) and thus controlling the movement of the lathe cutting tool (not shown). The output shaft of the lathe is connected with the shaft 48 of the Geneva gearing arrangement by the flexible shaft connection member 92. Rotation is intermittently transmitted from the shaft 48 to the shaft 60 by the Geneva gearing arrangement 43, and the rotation of shaft 60 is transmitted to the shaft 86 through the gear train 76, 78, 82 and 84. The shaft 86 is connected with the input shaft of the lathe through the flexible connection member 94 whereby rotation is transmitted to the lead screw (not shown) of the lathe.

When it is desired to provide a direct drive, or one to one drive ratio between the lathe output shaft and the Genera gearing arrangement 43, the flexible shaft 92 is connected with the fitting member 66 in any well known manner, whereby the shaft 48 is rotated simultaneously with the output shaft of the lathe. However, when it is desired to provide a two to one driving ratio for the Geneva gearing arrangement 43, the flexible shaft 92 is connected with the fitting 74 whereby the rotation of the output shaft of the lathe is transmitted to the shaft 48 through the meshing gears 70 and 68. It will be apparent that substantially any desired driving ratio may be provided between the output shaft of the lathe and the shaft 48, and there is no attempt to limit the driving ratios to one to one and two to one.

The output shaft of the lathe 90 drives or rotates the shaft 48 in accordance with the desired or selected drive ratio therebetween. The brake cam 44 and driver arm 46 are rotated simultaneously with the shaft 48. The locking cam 56 cannot rotate when any one of the concave portions 62 thereof is in contact with the arcuate outer periphery of the brake cam 44. Thus, no rotation is transmitted to the shaft 60 when the relative position between the brake cam 44 and locking cam 56 is such that the circular or arcuate portion of the brake cam 44 is riding along any of the concave portions 62 of the locking cam 56. However, just as one of the flat portions, such as the portion 50, of the brake cam 44 approaches one of the concave portions 62, one of the pins 54 enters the open end of the nearest slot 64 of the feed cam 58. The locking cam 56 is free to rotate during the time interval in which the flat portion 50 is moving across the concave portion 62. Thus, during the time interval when the flat portion is disposed adjacent one of the concave portions 62, the pin 54 engages the slot 64 for driving the feed cam 58 through a portion of a revolution. The locking cam 56, being disengaged from the arcuate portion of the brake cam 44, is free to rotate, and thus rotation is transmitted from the shaft 48 to the shaft 60.

As soon as the flat portion 50 leaves the respective concave portion 62, the next succeeding concave portion 62 comes into contact with the arcuate portion of the brake cam 44, and the locking cam 56 and feed cam 58 are held against rotation for stopping the rotation of the shaft 60. Thus, the shaft 60 is rotated intermittently through the Geneva gearing arrangement 43.

The rotation of the shaft 60 is transmitted to the shaft 86 through the gear train 76, 78, 82 and 84, as hereinbefore set forth, and the rotation of the shaft 86 is transmitted to the input shaft of the lathe 90 through the flexible connection member 94. Thus, the rotation of the feed screw of the lathe 90 is controlled for intermittent rotation thereof. When the lead screw of the lathe is rotated, the cutting tool moves in a longitudinal forward direction for cutting a helical groove on the work piece, as is well known. When the lead screw of the lathe is held against rotation, the cutting tool does not move longitudinally in the lathe, and the cutting tool cuts a straight circumferential groove on the work piece, as is well known. Thus, the control of the rotation of the lead screw of the lathe as hereinbefore set forth provides the cutting or machining of a combined helical and straight groove around the outer periphery of the cylindrical work piece in one continuous operation.

It is preferable in the present instance that the ratio of rotation of the brake cam 44 with respect to the work piece be one to one. In other words, the brake cam 44 will rotate once during one revolution of the work piece. Thus, each straight section 50 and 52 of the brake cam 44 will be moved into a position adjacent the locking cam 56 during one revolution of the work piece. With this particular ratio of rotation between the brake cam 44 and the work piece, it will be apparent that two helical portions and two straight portions will be provided on the outer periphery of the work piece during each revolution thereof. However, it is to be noted that any practical gearing arrangement may be provided between the work piece and the brake cam 44 to achieve substantially any desired rotational ratio therebetween. In this manner, substantially any number of straight portions and helical portions may be provided for each revolution of the work piece. Furthermore, the apparatus 10 disclosed herein may be utilized with any suitable type of machine, and is not limited for utilization with a lathe.

Figure 5:
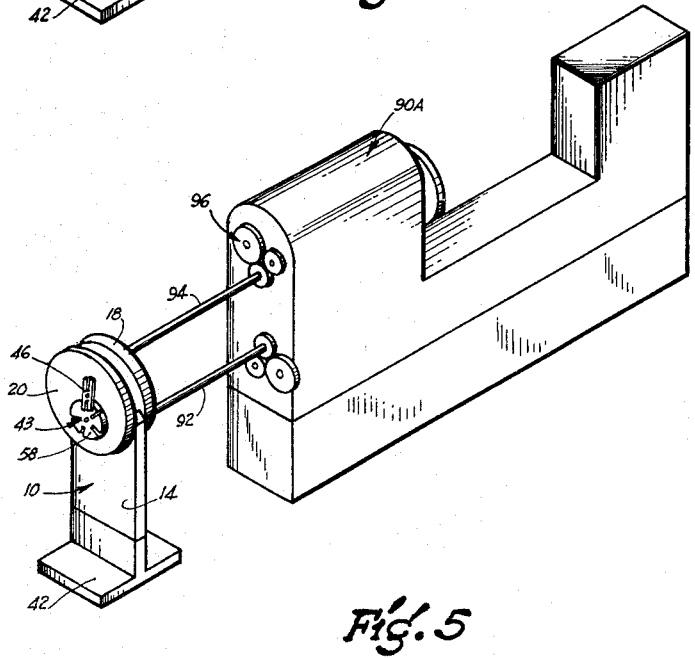
FIGURE 5 is a view similar to FIG. 4 depicting the novel lathe attachment secured to another type of lathe.

Referring now to FIG. 5, it is to be noted that the lathe 90A depicted therein is provided with a different output and input arrangement than that depicted in FIG. 4, and as indicated generally at 96. The housing 12 of the apparatus 10 may be quickly and easily rotated with respect to the support 14 in order to properly orientate the fittings 66 and 88 with the input and output shafts of the lathe 90A in order that the flexible shafts 92 and 94 may be utilized in a similar manner as hereinbefore set forth for connecting the gearing attachment 10 with the lathe 90A. The bolts 34 may be removed from the aligned apertures 30 and 32 to release the engagement between the support member 14 and housing 12. The housing 12 and plates 18 and 20 carried thereby may be rotated in the recess 16 to the desired position therefor to provide the proper orientation between the fittings 66 and 88 and the lathe 90A. The bolts 34 may then be inserted through the newly positioned aligned bores 30 and 32 and securely locked therein by the nuts 36. Furthermore, any height differential between the two lathes 90 and 90A may be compensated for by the adjustable height feature of the support member 14, as hereinbefore set forth. The gearing attachment apparatus 10 may then be connected with the lathe 90A in the manner hereinbefore set forth. Thus, the gearing attachmment apparatus 10 may be readily adapted for utilization with substantially any type and size lathe.

From the foregoing, it will be apparent that the present invention provides a novel gearing attachment for a lathe which may be quickly and easily adapted for utilization with substantially any type and size lathe. The novel gear housing may be adjusted for orientating the Geneva gearing arrangement carried thereby in accordance with substantially any disposition of the output and input shafts of the lathe, thus interposing the Geneva gearing arrangement in the gear train of the lathe in order to control the intermittent rotation of the lead screw of the lathe. In this manner, substantially any lathe may be utilized for machining or cutting a continuous groove having combined helical and straight portions on the outer periphery of the work piece in one continuous operation. The novel gearing attachment is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A universal gearing attachment for a lathe having an input shaft and an output shaft and comprising support means disposed in the proximity of one end of the lathe, housing means adjustably secured to the support means for orientation with respect to the position of the input and output shafts of the lathe, a gear train disposed within the housing and connected with the input shaft of the lathe for transmitting rotation thereto locking means rotatably mounted on one face of the housing and in connection with the output shaft of the lathe for rotation thereby, drive means secured to the locking means for simultaneous rotation therewith, driven means secured on the said one face of the housing and engageable by the drive means for intermittent rotation, said driven means connected with the gear train for transmitting intermittent rotation to the input shaft of the lathe whereby the lathe may be utilized for machining a continuous circumferential groove having combined parallel and helical portions throughout a single revolution of a work piece.

2. A universal gearing attachment for a lathe having mutually parallel input and output shafts and comprising an adjustable support disposed in the proximity of one end of the lathe, a housing adjustably secured to the support for rotatable orientation with respect to the lathe in accordance with the position of the input and output shafts thereof, a gear train disposed within the housing, a first transversely extending shaft journalled in the housing and connected with the output shaft for rotation thereby, a second transversely extending shaft journalled in the housing and connected between the gear train and the input shaft whereby rotation is transmitted through the gear train from the said second shaft to the input shaft, locking means rotatably secured on one face of the housing and connected with one of said transversely extending shafts for rotation thereby, driver means secured to the locking means for rotation simultaneously therewith, locking means journalled on the said one face of the housing and engageable by the driver means for rotation thereby, means cooperating between the driven means and locking means whereby the rotation of the driven means by the driver means is intermittent, said driven means connected with the second of said transversely extending shafts for transmitting intermittent rotation thereto whereby intermittent rotation is transmitted to the input shaft of the lathe through the gear train in order that a continuous circumferential groove having combined parallel and helical portions may be provided in one revolution of the work piece.

3. A universal gearing attachment for a lathe having an input and output shaft, adjustable support means disposed adjacent one end of the lathe, an arcuate recess provided on the upper end of the support means, a substantially cylindrical housing disposed in said recess, oppositely disposed plate members provided on said housing and adjustably secured to the support means to provide for rotational orientation of the housing with respect to the lathe, a gear train disposed within the housing, first shaft means journalled in the housing and connected with the output shaft for rotation thereby, second shaft means journalled in the housing and connected with the gear train, a braking element rotatably mounted on one of said plates and connected with the said first shaft for rotation simultaneously therewith, a drive arm secured to said first shaft, a feed member rotatably mounted on said one flange and connected with said second shaft to transmit rotation thereto, adjustable pin means carried by the drive arm for engagement with the feed member to transmit rotation thereto, locking means associated with the feed member and cooperating with the braking element to provide intermittent rotation of the feed member, said intermittent rotation of the feed member being transmitted to the input shaft of the lathe by the said second shaft and gear train whereby the lathe may be utilized for machining a continuous circumferential groove having combined parallel and helical portions throughout a single revolution of a work piece.

4. A universal gearing attachment as set out in claim 3 wherein the braking element is provided with at least one flat surface on the outer periphery thereof and the locking means is provided with a plurality of slightly arcuate surfaces whereby the locking means may rotate only when the said flat surface is in engagement with one of said arcuate surfaces.

5. A universal gearing attachment comprising a support means, housing means adjustably secured to the support means, a gear train disposed within the housing first rotatable shaft member journalled in the housing, a second rotatable shaft member journalled in the housing and connected with the gear train, locking means rotatably mounted on one face of the housing and in connection with the first shaft member for rotation thereby, drive means secured to the locking means for sumultaneous rotation therewith, driven means secured on the said face of the housing and engageable by the drive means for intermittent rotation, said driven means connected with the gear train through said second shaft for transmitting intermittent rotation to the second shaft and gear train.

6. A universal gearing attachment comprising an adjustable support member, a housing adjustably secured to the support for rotatable orientation with respect thereto, a gear train disposed within the housing, a first transversely extending rotatable shaft journalled in the housing, a second transversely extending shaft journalled in the housing and connected with the gear train for transmitting rotation thereto, locking means rotatably secured on one face of the housing and connected with the said first transversely extending shaft for rotation thereby, driver means secured to the locking means for rotation simultaneously therewith, feed means jornalled on the said one face of the housing and engageable by the driver means for rotation thereby, means cooperating between the feed cam means and locking means whereby the rotation of the feed means by the driver means is intermittent, said feed means connected with the second of said transversely extending shafts for transmitting intermittent rotation thereto during a continuous rotation of the first of said transverse shafts.

7. A universal gearing attachment comprising adjustable support means, an arcuate recess provided on the upper end of the support means, a substantially cylindrical housing disposed in said recess, oppositely disposed plate members provided on said housing and adjustably secured to the support means to provide for rotational orientation of the housing with respect thereto, a gear train disposed within the housing, first rotatable shaft means journalled in the housing, second shaft means journalled in the housing and connected with the gear train, a braking element rotatably mounted on one of said plates and connected with the said first shaft for rotation simultaneously therewith, a drive arm secured to said first shaft, a feed member rotatably mounted on said one flange and connected with said second shaft to transmit rotation thereto, adjustable pin means carried by the drive arm for engagement with the feed member to transmit rotation thereto, a locking means associated with the feed member and cooperating with the braking element to provide intermittent rotation of the feed member, said intermittent rotation of the feed member being provided during a continuous rotation of the first shaft.

8. A universal gearing attachment as set forth in claim 7 wherein the braking element is provided with at least one flat surface on the outer periphery thereof and the locking means is provided with a plurality of slightly arcuate surfaces whereby the locking means may rotate only when the said flat surface is in engagement with one of said arcuate surfaces.

References Cited in the file of this patent

UNITED STATES PATENTS

| | | |
|---|---|---|
| 1,825,442 | Chambon | Sept. 29, 1931 |
| 2,060,158 | Yager et al. | Nov. 10, 1936 |
| 2,813,435 | Schumb | Nov. 19, 1957 |
| 2,906,137 | Bade | Sept. 29, 1959 |

FOREIGN PATENTS

| | | |
|---|---|---|
| 1,071,720 | France | Mar. 10, 1954 |

OTHER REFERENCES

American Machinist, vol. 90, page 117, (January 31, 1946).